April 10, 1928.

E. F. ATKINS 1,665,250

SPRING COLLET CHUCK

Filed May 10, 1927　　2 Sheets-Sheet 1

INVENTOR
Earl F. Atkins
BY Redding, Greeley, O'Shea & Campbell
his ATTORNEYS

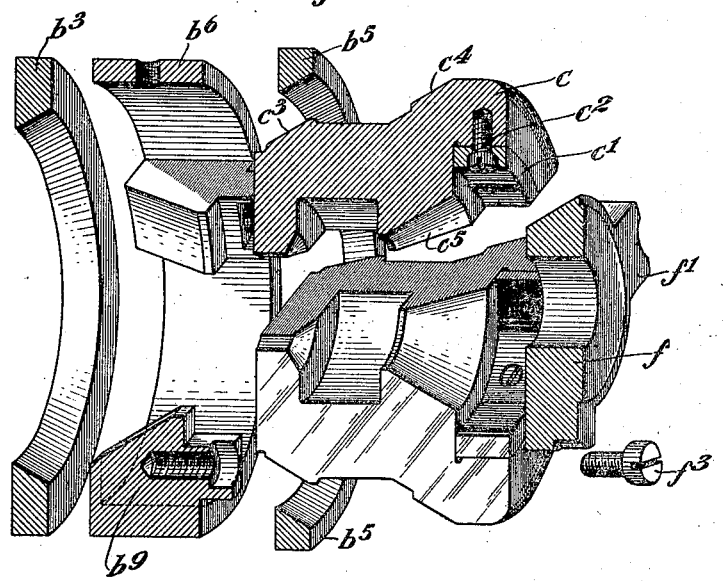
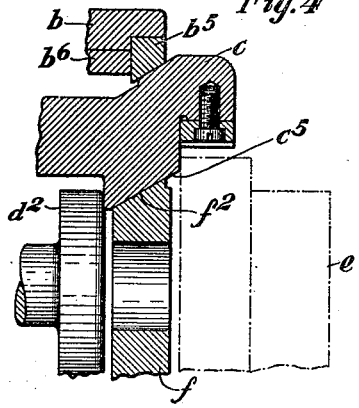
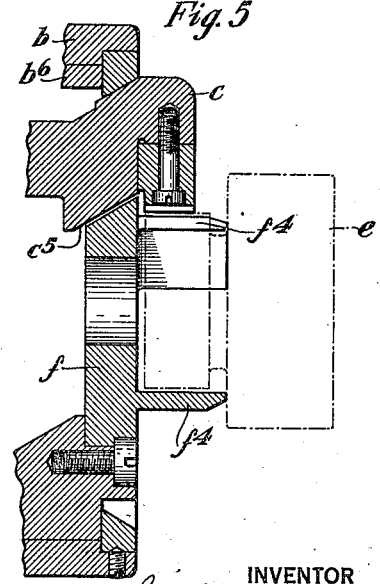
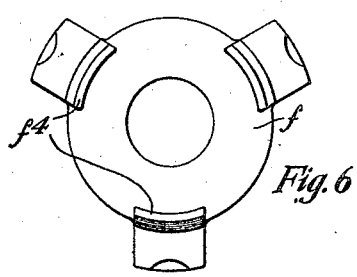

Patented Apr. 10, 1928.

1,665,250

UNITED STATES PATENT OFFICE.

EARL F. ATKINS, OF PLAINFIELD, NEW JERSEY, ASSIGNOR TO INTERNATIONAL MOTOR COMPANY, OF NEW YORK, N. Y., A CORPORATION OF DELAWARE.

SPRING COLLET CHUCK.

Application filed May 10, 1927. Serial No. 190,329.

The present invention relates to chucks carried by lathes, milling machines and other similar structures wherein the piece to be machined is held in proper relation to the cutting tool and the necessary operations are performed in a desired manner. In many instances, where one particular operation is effected, or where a series of cuts are to be taken on every piece machined, it is the usual practice to secure the piece in the chuck and take the cuts from a previous and standard setting of the tool and work, the setting having been made to accommodate the castings to be machined.

With a given setting, it is found that the castings vary in size and cause a lack of uniformity in the finished article. Particularly in collet chucks where the jaws are moved axially into engaging position by means of cams, the surfaces of which are inclined axially to move the jaws inwardly, does the irregularity between the size of the castings become troublesome. This will be apparent, since a piece of smaller diameter requires greater axial movement of the jaws against the cam face in order to give the necessary movement to the jaws to cause them to engage the smaller piece.

Confronted with this situation, it is an object of the present invention to provide a collet chuck with means to insure a proper positioning of the piece to enable accurate cutting to result without resetting the machine in spite of irregularities in the relative sizes of successive castings. The broad idea upon which the invention is formulated includes the provision of a positive stop, in a preferred construction shown as mounted in the center of the chuck, against which the casting, or piece to be machined, abuts in the movement of the jaws to grip it. Regardless of the extent of movement of the jaws necessary to effect the gripping, the stop will always position the work in the same position relative to the cutting tool and the difficulties encountered in previous constructions are thus overcome.

A further object of the invention is to incorporate in the structure which effects this positioning, hereinafter termed the "stop", a positive means for expanding the jaws automatically in disengaging the work so that it may be withdrawn easily without manually separating the jaws.

Among other objects it is proposed to embody the above features in a construction which is strong and sure of operation and in carrying out the above thought the chuck has been designed so that the gripping thrust and reactions are taken directly by the external shell.

In order that the invention may be understood more fully and the specific manner in which it may be constructed, reference will now be had to the accompanying drawings for a more detailed description thereof, wherein:

Figure 3 is a perspective view, partly in section, showing the manner in which the elements are assembled.

Figure 4 is a segmental view in section showing the manner in which the jaws are positively separated when they are moved to disengage the work.

Figure 5 is a longitudinal section showing a modified form of the invention.

Figure 6 is a detail view showing the stop used in the modified construction.

Figure 1:
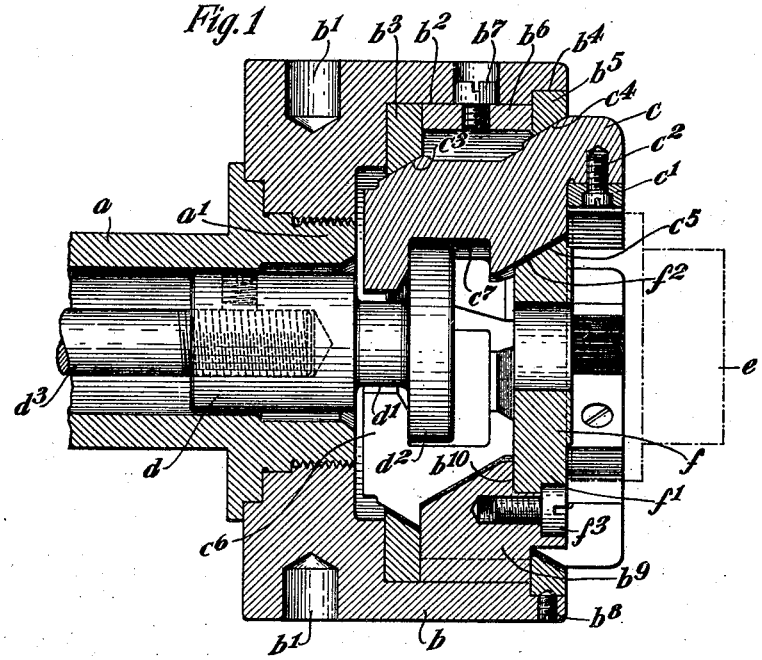
Figure 1 is a view in longitudinal section showing a chuck with the stop mounted therein.
Figure 2:
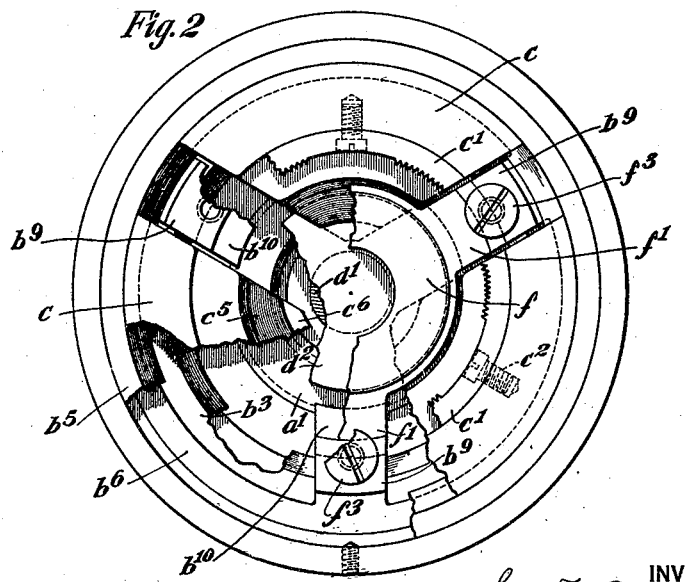
Figure 2 is an end elevation with parts broken away to show the manner in which the stop is mounted.

Referring particularly to Figures 1 through 4, $a$ designates a hollow spindle carried by a lathe or other machine and provided with a threaded extension $a'$. The chuck is formed of a hollow cylindrical shell member $b$ which is threaded to the extension $a'$ and may be tightened by means of recesses $b'$ adapted to receive a suitable spanner wrench.

Pressed into the inner cylindrical portion $b^2$ is an inner cam ring $b^3$ and in the cylindrical portion $b^4$ of greater diameter is an outer cam ring $b^5$. The cam faces are preferably formed to be at 30 degrees from the axis of the chuck and a spacer sleeve $b^6$ is positioned between the rings. Suitable set screws $b^7$ secure the sleeve $b^6$ in position and set screws $b^8$ position cam ring $b^5$.

Within the cylindrical shell $b^2$ jaws $c$ are provided, there being preferably three spaced about the internal periphery of the shell, each having a suitable gripping pad $c'$ to bear against the work, and held in position by screws $c^2$. The outer surfaces of the jaws are formed with cam faces $c^3$ and $c^4$ which engage cam rings $b^3$ and $b^5$, respectively. The inner surface of the jaws has formed thereon cam surface $c^5$ between which and an extension $c^6$ is a recessed groove $c^7$. A dog $d$ having a recessed portion $d'$ and a flanged end $d^2$ is carried on an operating rod $d^3$. The extension $c^6$ is received in the groove $d'$ and the flanged end $d^2$ engages the groove $c^7$. In this manner rod $d^3$ operates the jaws of the chuck and causes the work $e$ to be securely held.

Formed on the spacer ring $b^6$ are spaced lugs $b^9$ which lie between adjacent sides of the jaws of the chuck. Notches $b^{10}$ are formed on the lugs and receive arms $f'$ of a centrally disposed stop member $f$. There are a number of arms $f'$ to equal the number of lugs and it is in this manner that the stop member is positioned. Upon the sides of the stop $f$, cam faces $f^2$ are provided for co-operating with cam faces $c^5$ to separate the jaws when the dog $d$ moves outwardly. Screws $f^3$ secure the arms $f'$ to the lugs.

It is frequently desirable to provide a stop of the character described above which abuts against a certain portion of the piece to be machined and permits the jaws to engage another portion. Accordingly a modified form of the invention is shown in Figures 5 and 6. The major portion of the chuck described above is used, the only difference being in the form of the stop employed. As shown in these figures, the stop $f$ is provided with spaced fingers $f^4$ which extend outwardly parallel to the axis of the chuck and are designed to engage the piece $e'$ shown in dot and dash lines. The jaws $c$ lie between the fingers $f^4$ and their engaging movement is thus unimpaired by the fingers.

It will be seen that the stop will positively position the work in a predetermined position regardless of the relative sizes of the castings and accurate cuts are thus assured. Designs may be used to accommodate pieces of various shapes and surface contours and the invention is not to be limited save as defined in the appended claims.

What I claim is:

1. A collet chuck comprising a jaw to engage the work, a plurality of cam surfaces on the exterior of the jaw, removable cam rings co-operating therewith in the axial movement of the jaw with respect to the chuck to move the jaw into engagement with the work, a cam surface on the interior of the jaw, a stop to position the work positively in an axial direction, and a cam surface on the stop co-operating with the interior cam surface in the reverse movement of the jaw to disengage the latter positively from the work.

2. A collet chuck comprising a shell, a jaw movably carried in the shell, means to move the jaw axially with respect to the shell, removable cam rings on the interior of the shell, a spacer ring therebetween, and co-operating cam surfaces on the exterior of the jaw for moving the jaw into engagement with the work in its axial movement.

3. A collet chuck comprising a shell, a jaw movably carried in the shell, means to move the jaw axially with respect to the shell, cam rings on the interior of the shell, a spacer ring therebetween, a stop carried by the spacer ring, and co-operating cam surfaces on the exterior of the jaw for moving the jaw into engagement with the work in its axial movement.

4. A collet chuck comprising a shell, a jaw movably carried in the shell, means to move the jaw axially with respect to the shell, cam rings on the interior of the shell, a spacer ring therebetween, a stop carried by the spacer ring, radial lugs formed thereon, a stop carried by the lugs, and co-operating cam surfaces on the exterior of the jaw for moving the jaw into engagement with the work in its movement.

5. A collet chuck comprising a shell, a jaw movably carried in the shell, means to move the jaw axially with respect to the shell, cam rings on the interior of the shell, a spacer ring therebetween, a stop carried by the spacer ring, radial lugs formed thereon, a stop plate, arms on the stop, means for securing the arms and lugs, and co-operating cam surfaces on the exterior of the jaw for moving the jaw into engagement with the work in its axial movement.

6. A collet chuck comprising a shell, a plurality of spaced jaws within the shell, a cam ring carried by the shell, cam surfaces on the jaws for engaging the ring in their axial movement with respect to the shell, a stop, arms on the stop extending between adjacent ends of the jaws, and means to secure the arms to the shell.

7. A collet chuck comprising a shell, a plurality of spaced jaws within the shell, cam rings carried by the shell, a spacer ring between the cam rings, cam surfaces on the jaws for engaging the rings in their axial movement with respect to the shell, a stop, supporting arms thereon, cam surfaces on the stop, cam surfaces on the interior of the jaws for engaging therewith in the reverse movement of the jaws, and means to secure the arms to the spacer ring.

This specification signed this 29 day of April, A. D. 1927.

EARL F. ATKINS.